May 31, 1955 F. W. TAYLOR 2,709,537
FEEDING APPARATUS FOR BELT CONVEYERS AND THE LIKE
Filed May 15, 1950 2 Sheets-Sheet 1

INVENTOR.
F. W. Taylor,
ATTORNEY

May 31, 1955  F. W. TAYLOR  2,709,537
FEEDING APPARATUS FOR BELT CONVEYERS AND THE LIKE
Filed May 15, 1950  2 Sheets-Sheet 2

INVENTOR.
Frederick W. Taylor,
BY
ATTORNEY

United States Patent Office 2,709,537
Patented May 31, 1955

2,709,537

FEEDING APPARATUS FOR BELT CONVEYERS AND THE LIKE

Frederick W. Taylor, Richmond, Va., assignor to Chain Belt Company, Milwaukee, Wis., a corporation of Wisconsin Application May 15, 1950, Serial No. 162,053

4 Claims. (Cl. 222—108)

The invention relates to apparatus for feeding materials to belt conveyers and the like, and has for one of its objects the provision of an improved conveyer-feeding mechanism of the rotary disk type.

Various forms of rotary disk feeders have been heretofore proposed and employed to effect the regulated feeding of granular and similar materials from storage bins to traveling belt conveyers. One such mechanism comprises a horizontally disposed power-driven disk located beneath the discharge opening of a storage bin, and having a concentric arcuate skirt non-rotatably supported above the peripheral portion of the disk to prevent escape of the material over the edge of the latter throughout a major portion of its circumference. The feeder is located adjacent one side of the belt conveyer, with the unskirted portion of the disk above the latter, and a vertical plow or scraper is supported radially or chordally above this portion of the disk for the purpose of scraping the material therefrom for gravitational deposit onto the conveyer belt.

The lower edge portion of the skirt plate carries a strip of rubber or similar flexible material, engageable with the disk in an effort to provide a seal for the running joint between the two; but since in use the disks frequently become warped and/or the skirt plate distorted, such strip often fails to properly contact the disk whereby to prevent escape of the material being fed, and the construction has proved far from satisfactory. In the case of some materials, such for example as the wood chips used in the making of paper, cardboard and the like, even though the seal is kept in its best condition by regular inspection and maintenance, the thin flat chips will work their way through it and be discharged into a pile around the base of the feeder requiring frequent manual removal.

A further object of the invention is to provide a rotary disk feeder construction in which the difficulty just mentioned is effectively overcome. Other and more specific objects will appear as the description proceeds.

In the accompanying drawings forming a part of this specification, in which like reference characters designate like parts in all the views, there is illustrated one form of apparatus constructed in accordance with the invention, which has been designed primarily for the feeding of wood chips, although as will be obvious to those skilled in the art, it may readily be employed in connection with other materials.

Figure 1:
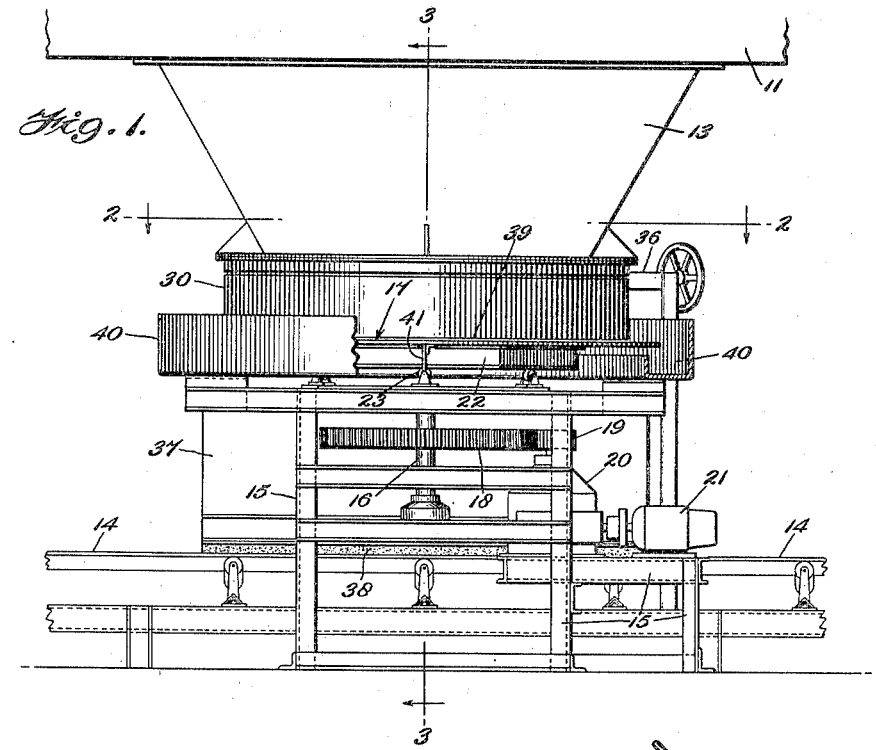
Figure 1 is an elevational view of the apparatus, partly broken away and in section, as seen from the side remote from the belt conveyer.

Referring to the said drawings in greater detail, a storage bin 11 is provided with a discharge opening 12 through which the chips or other material to be fed may pass into a truncated conical hopper 13 supported by the said bin. Beneath the hopper and adjacent one side of the belt conveyer 14 which is to receive the material there is provided a framework 15 in which is journalled a vertical shaft 16 the upper end of which carries a horizontal feeding disk 17 disposed somewhat below the open lower end of the hopper 13. The shaft 16 also mounts a gear 18 which meshes with a pinion 19 (Fig. 1) carried by the output shaft of a reduction-gear mechanism 20 which is driven by an electric or other motor 21 mounted on a portion of the framework 15. The disk 17 may thus be rotated at a comparatively low speed. The under face of the disk is provided with a reinforcing structure 22, which also constitutes a track resting upon and supported by a plurality of rolls 23 mounted on the framework 15.

Figure 3:
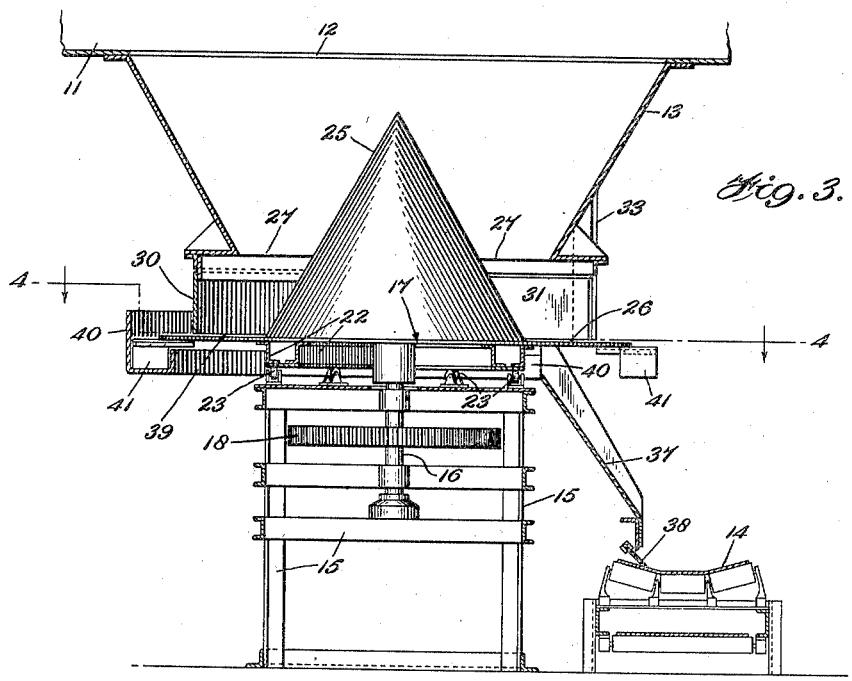
Fig. 3 is a vertical sectional view, on approximately the plane indicated by the line 3—3 in Figure 1, looking in the direction of the arrows.

A conical member 25 is secured to the upper face of the disk 17 concentric therewith, and extends upwardly into the hopper 13, as clearly shown in Fig. 3. The diameter of the base of the cone is substantially less than that of the disk, and thus the peripheral portions of the disk constitute an annular shelf or ledge 26 surrounding the base of the cone 25. As will be clear from said figure, the conical surface of the member 25 co-operates with the perimetric walls of the hopper 13 to provide an annular feeding orifice 27 through which the material from the bin may pass to the shelf 26; and the frictional contact of the material with the surfaces of the rotating cone and shelf is sufficient to prevent jamming and arching or bridging of the material in this orifice, thus insuring a regular and constant feed.

Figure 2:
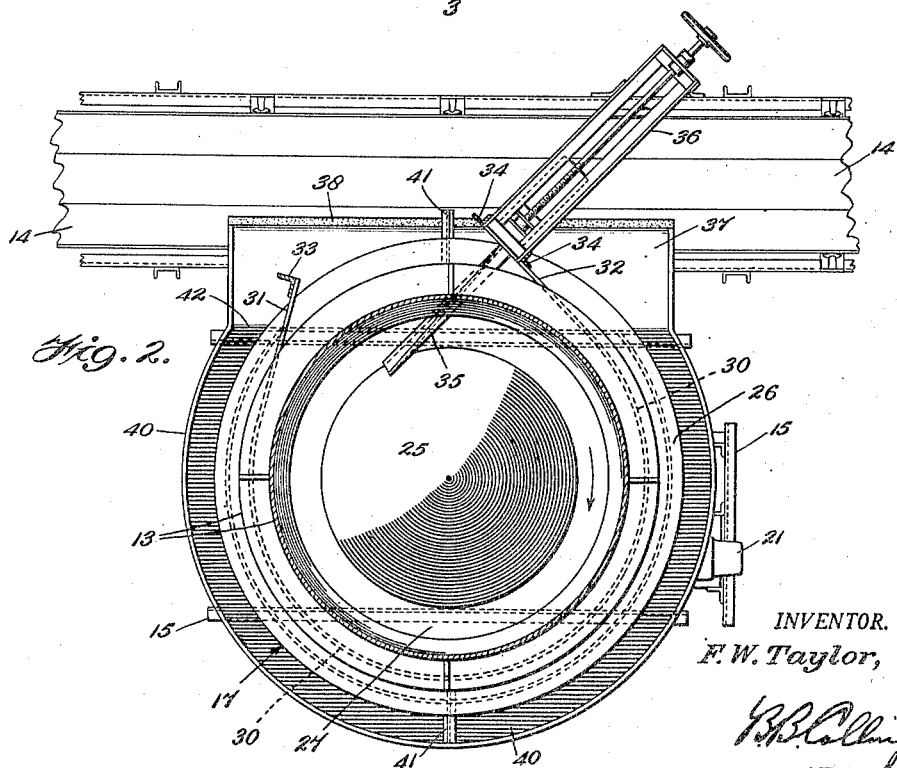
Fig. 2 is a sectional-plan view of the parts shown in Fig. 1, on approximately the plane indicated by the line 2—2 in said figure, looking down.

Secured to and depending from the lower portion of the hopper 13 is an arcuate skirt 30, comprising a plate the lower edge of which just clears the upper face of the disk 17, in concentric spaced relation to the base of the cone 25, as will be clear from Figs. 2 and 3. The skirt extends through an angle of approximately 270° and at the side adjacent the conveyer belt 14 terminates in convergent tangential end portions 31 and 32 extending to or slightly beyond the edge of the disk, where they are supported by vertical angle irons 33 and 34 respectively, depending from the hopper 13. The skirt 30 laterally confines the material fed to the annular shelf 26 and prevents its discharge over the shelf edge except at the gap between the spaced end portions 31 and 32 of the skirt, where it may flow over said edge and fall to the conveyer 14, as will be readily understood from Fig. 2.

To insure such discharge of the material from the disk, a horizontally adjustable plow or scraper 35 is provided, extending angularly across the shelf 26 from the end 32 of the skirt, the supporting frame 36 of such plow being carried by the angle irons 34. To insure that material discharged from the disk is deposited upon the belt 14, an inclined apron 37 is provided below the discharge sector of the disk, extending downwardly to just above the belt where its lower edge carries a flexible or resilient contact strip 38 engaging the belt.

Figure 4:
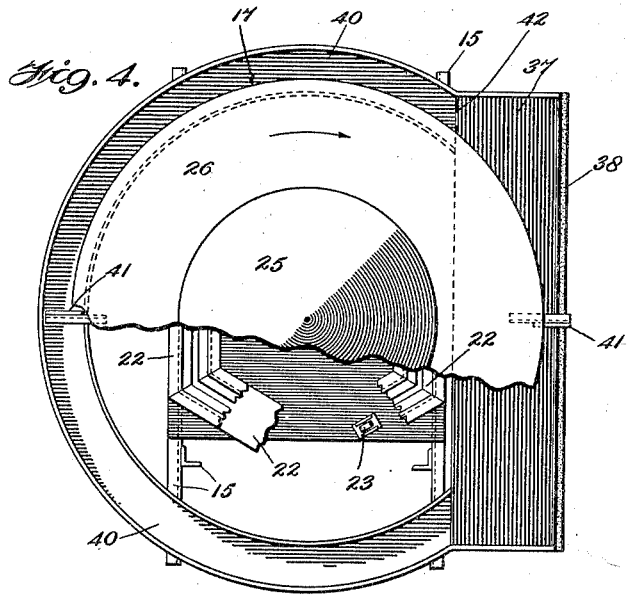
Fig. 4 is a horizontal sectional view, on approximately the plane indicated by the line 4—4 in Figure 3, looking down.

The lower edge of the skirt 30 is positioned as close as practicable to the upper face of the disk 17, but no attempt is made to seal the running joint 39 thus formed between these elements. Instead, in order to prevent any chips or other material which may work its way through the joint from falling to and piling up on the ground about the framework 15, an arcuate trough 40 is fixedly positioned on the upper portion of said framework, surrounding and extending beneath the skirted portion of the periphery of the disk 17. The outer peripheral wall of the trough is spaced outwardly from the periphery of the disk 17 a substantial distance, whereby material finding its way through the running joint between the upper face of the said disk and the lower edge of the skirt 30 and thus to the outer portion of the shelf 26 may be freely discharged into the trough. As will be clear from Figs. 2 and 4, the open ends of this trough abut the upper end of the apron 37. One or more blades or sweeps 41 are secured to and depend from the disk 17, in position to traverse the trough as the disk rotates; and as will be readily understood, any material which works its way through the running joint 39 between the skirt and disk will be deposited in the trough 40, where it will be swept around by the blades 41 to the discharge port 42 of the trough, where it will be discharged to the apron 37 and guided thereby to the conveyer belt 14. Thus, the necessity for manual removal of leakage material from the area about the feeder will be avoided.

While one form of the invention has been illustrated and described, it will be apparent that those skilled in the art may vary the details of construction as well as the precise arrangement of parts without departing from the spirit of the invention, and therefore it is not wished to be limited to the above disclosure except as may be required by the appended claims.

What is claimed is:

1. In apparatus for feeding wood chips, granular materials and the like to a belt conveyer, the combination of a horizontal rotatably mounted feeding disk adapted to receive the material to be fed upon its upper surface; means for rotating said disk; an arcuate skirt non-rotatably supported above the disk with its lower edge in proximity to said upper surface of the disk to form a running joint therewith, said skirt extending about a major part of the peripheral portions of the disk whereby to substantially prevent circumferential discharge of the material from the disk throughout a major arc of its periphery, said skirt terminating at spaced points to provide a gap through which the material may be discharged; a receptacle extending outwardly from the periphery of the disk, into which any material which may work its way through said running joint between the disk and skirt may be freely discharged from the peripheral portion of the disk, said receptacle having a discharge port; and movable means traversable in the receptacle to move material therein to said discharge port.

2. In apparatus for feeding wood chips, granular materials and the like to a belt conveyer, the combination of a horizontal rotatably mounted feeding disk adapted to receive the material to be fed upon its upper surface; means for rotating said disk; an arcuate skirt non-rotatably supported above the disk with its lower edge in proximity to said upper surface of the disk to form a running joint therewith, said skirt extending around a major part of the peripheral portion of the disk whereby to substantially prevent circumferential discharge of the material from the disk throughout a major arc of its periphery, said skirt terminating at spaced points to provide a gap through which the material may be discharged; a receptacle extending along the skirted portion of the disk and outwardly of the periphery of the latter to freely receive from the peripheral portion of the disk any material which may work its way through said running joint between the disk and skirt, said receptacle having a discharge port; and means movable by the disk to traverse said receptacle, whereby to move material therein through said discharge port.

3. In apparatus for feeding wood chips, granular materials and the like to belt conveyers, the combination of a horizontal rotatably mounted feeding disk adapted to receive the material to be fed upon its upper surface; means for rotating said disk; an arcuate skirt non-rotatably supported above the disk with its lower edge in proximity to said upper surface of the disk to form a running joint therewith, said skirt extending around a major part of the peripheral portion of the disk whereby to substantially prevent discharge of the material from the disk throughout a major arc of its circumference, said skirt terminating at spaced points to provide a gap through which the material may be discharged; a receptacle extending around and beneath the skirted portion of the disk periphery in substantial spaced relation thereto, for freely receiving from the peripheral portion of the disk any material which may work its way through said running joint between the disk and skirt, said receptacle having a discharge port adjacent the discharge gap in said skirt; and means carried by the disk and traversable thereby through the receptacle to move material therein to and through its said discharge port.

4. In apparatus for feeding wood chips, granular materials and the like to a belt conveyer, the combination of a horizontal rotatably mounted feeding disk adapted to receive the material to be fed upon its upper surface; means for rotating said disk; an arcuate skirt non-rotatably supported above the disk with its lower edge in proximity to said upper surface of the disk to form a running joint therewith, said skirt extending around a major part of the peripheral portion of the disk whereby to substantially prevent discharge of the material from the disk throughout a major arc of its circumference, said skirt terminating at spaced points to provide a gap through which the material may be discharged; an annular trough extending around and beneath the skirted portion of the disk periphery in substantial spaced relation thereto, for freely receiving from the peripheral portion of the disk any material which may work its way through said running joint between the disk and skirt, said trough having a discharge port adjacent the discharge gap in the skirt; and a sweep blade carried by the disk and traversable thereby through the trough to move material therein to and through its said discharge port.

References Cited in the file of this patent

UNITED STATES PATENTS

| | | |
|---|---|---|
| 201,543 | Marquis | Mar. 19, 1878 |
| 1,548,126 | Field | Aug. 4, 1925 |
| 1,731,515 | Andrews | Oct. 15, 1929 |
| 1,781,097 | Bonnot | Nov. 11, 1930 |
| 2,574,231 | Sinden | Nov. 6, 1951 |